(12) United States Patent
Lou et al.

(10) Patent No.: US 8,121,211 B2
(45) Date of Patent: Feb. 21, 2012

(54) ADAPTIVE SWITCHING TECHNIQUES FOR HYBRID AUTOMATIC REPEAT REQUEST SYSTEMS

(75) Inventors: Hanqing Lou, Garland, TX (US); Ahmadreza Hedayat, Allen, TX (US); Genyuan Wang, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 872 days.

(21) Appl. No.: 12/054,502

(22) Filed: Mar. 25, 2008

(65) Prior Publication Data

US 2008/0240208 A1 Oct. 2, 2008

Related U.S. Application Data

(60) Provisional application No. 60/908,173, filed on Mar. 26, 2007.

(51) Int. Cl.
H04B 7/02 (2006.01)
(52) U.S. Cl. ......... 375/267; 375/260; 375/347; 375/349
(58) Field of Classification Search .................. 375/267, 375/260, 299, 347, 349
See application file for complete search history.

(56) References Cited

U.S. PATENT DOCUMENTS

| 2003/0133408 | A1 | 7/2003 | Cheng et al. | |
|---|---|---|---|---|
| 2004/0042385 | A1 | 3/2004 | Kim et al. | |
| 2004/0198265 | A1 | 10/2004 | Wallace et al. | |
| 2005/0047384 | A1 | 3/2005 | Wax et al. | |
| 2005/0117520 | A1* | 6/2005 | Miyoshi ........................ | 370/238 |
| 2005/0281189 | A1* | 12/2005 | Lee et al. ...................... | 370/208 |
| 2007/0098097 | A1* | 5/2007 | Khan et al. .................... | 375/260 |
| 2007/0223422 | A1* | 9/2007 | Kim et al. ...................... | 370/334 |
| 2007/0230324 | A1* | 10/2007 | Li et al. ......................... | 370/204 |
| 2008/0181094 | A1 | 7/2008 | Lou et al. | |

FOREIGN PATENT DOCUMENTS

| EP | 1501210 A1 | 1/2005 |
|---|---|---|
| EP | 1684445 A2 | 7/2006 |
| EP | 1845636 A1 | 10/2007 |
| EP | 1887713 A2 | 2/2008 |
| WO | 2006082637 A1 | 8/2006 |

OTHER PUBLICATIONS

International Search Report and Written Opinion dated Mar. 7, 2008, cited in PCT/US2007/83191.
International Search Report and Written Opinion cited in PCT/US2008/058166 dated Sep. 18, 2008.

\* cited by examiner

Primary Examiner — Kabir A Timory
(74) Attorney, Agent, or Firm — Edell, Shapiro & Finnan, LLC (57) ABSTRACT

An adaptive transmission selection technique is provided. A retransmission scheme is selected for a multiple-input-multiple-output wireless system. A plurality of communication techniques is provided for when a first device needs to retransmit a signal to a second device. The first device determines when the original signal, transmitted to the second device using beamforming techniques, needs to be retransmitted to the second device. If a retransmission is needed, the first device determines channel conditions with respect to the second device. The first device selects a retransmission scheme from a plurality of transmission schemes based on the channel conditions for retransmitting the signal. A first retransmission technique is selected when the channel conditions are static. A second retransmission technique is selected when the channel conditions are relatively slowly changing, and a third retransmission technique is selected when the channel conditions are relatively quickly changing.

23 Claims, 6 Drawing Sheets

ADAPTIVE SWITCHING TECHNIQUES FOR HYBRID AUTOMATIC REPEAT REQUEST SYSTEMS

CROSS REFERENCE TO RELATED APPLICATIONS

The present application claims priority to U.S. Provisional Patent Application No. 60/908,173, which was filed on Mar. 26, 2007, the entirety of which is incorporated herein by reference.

BACKGROUND

Automatic repeat request (ARQ) is an error control mechanism utilized in many communication systems. When a packet error is detected at the receiver, which is usually done by cyclic redundancy check (CRC) codes, an automatic repeat request acknowledgement is sent by the receiver back to the transmitter. The transmitter then retransmits the packet. Hybrid ARQ (HARQ) is a variation of a conventional ARQ system that utilizes forward error correction codes (FEC) in the system to further improve the system performance. HARQ is widely used in real communication systems, such as High Speed Packet Downlink Access (HSPDA) or High Speed Packet Uplink Access (HSPUA), IEEE 802.16 (Worldwide Interoperability for Microwave Access (WiMAX), and 3rd Generation Partnership Project (3GPP) Long Term Evolution (LTE).

The various embodiments disclose herein relate to wireless communications networks, and more specifically, relate to Multiple-Input-Multiple-Output (MIMO) communications networks. It is general understanding that a wireless station or device may be either a mobile terminal or a fixed terminal such as a base station (BS). A typical MIMO network is comprised of a BS—with multiple antennas and multiple mobile stations (MSs), at least one of which has multiple antennas. Assuming that there are M antennas at the BS and N antennas at one of the MSs, there is an MxN MIMO channel between the BS and the MS. Conventional communications systems have recently introduced MIMO systems with multiple transmit/receive antennas to further improve the capacity of the communications system. MIMO systems that employ Orthogonal Frequency Division Multiplexing (OFDM) are utilized in 3G systems (i.e., third generation of mobile phone standards and technology) and beyond 3G systems, such as IEEE 802.16 d/e (WiMAX), 3GPP LTE, and 3GPP2.

Spatial, temporal, and frequency diversity techniques can be considered and exploited in general MIMO-OFDM systems. Such diversity techniques improve the reliability and/or throughput of a wireless communications system by utilizing two or more communication channels with different fading or changing characteristics to transmit messages. Diversity techniques play an important role in combating fading, co-channel interference, and avoiding error bursts. Diversity techniques allow the receiver to take the average of the signals received from a "bad" channel and a "good" channel to further improve link performance of the communications system.

There is an ever-increasing demand on mobile wireless operators to provide voice and high-speed data services. At the same time, operators want to support more users per BS in order to reduce overall network cost and make the services affordable to subscribers. As a result, wireless systems that enable higher data rates and higher capacities have become very attractive. One way smart antenna technology has addressed this problem is by employing advanced signal processing techniques called beamforming (BF). Beamforming technology has found its way into all the major wireless standards including 3GPP, 3GPP2, IEEE 802.16, and IEEE 802.11 systems.

Beamforming techniques utilize multiple antennas or antenna arrays to control the direction of the transmitted signal. Using beamforming, each user in a wireless communications system is adaptively assigned a particular beam pattern associated with the current channel condition associated with that device. The instantaneous or current channel conditions may be determined by measuring the channel state information (CSI), which is information about a current signal channel in the wireless communications system. CSI is represented by the current channel matrix H, a mathematical construct that represents a MIMO channel in the communications system. The MIMO channel may be modeled according to the following equation $r=Hx+n$, where r is a vector representing receiving signals; H is a matrix representing channel characteristic; x is a vector representing transmitting signals; and n is a vector representing channel noise. The values for r, x, n, H are usually not constant. The system usually requires some information regarding H to determine what information was sent from the transmitter or to enhance the system performance, including increasing transmission speed. When the CSI is known both to the transmitter and the receiver, the beamforming technique is optimum in terms of capacity of the wireless communications network. When the CSI is not known, beamforming is not effective and diversity techniques (for example, the Alamouti scheme) can be employed to improve the reliability of a message signal by utilizing two or more communication channels with different fading characteristics. When the CSI is partially known, however, it is not clear which techniques are optimum.

The CSI at the transmitting device is usually estimated based on the signals received from itself or another device. In real communications systems, the CSI at the transmitting device may be obtained from a feedback channel in Frequency Division Duplex (FDD) systems (close loop) by utilizing the received signal at the receiver site, or estimated based on receiving signals from a reverse channel and utilizing the reciprocal property of the channel in Time Division Duplex (TDD) systems (open loop). In both cases, there is a delay, such as a feedback delay in FDD, or a delay between current channel and the channel used for CSI estimation in TDD.

In HARQ systems, it is very possible that the CSI at transmitting device is not available for each HARQ retransmission. However, it is assumed that the CSI is always available for the first transmission. In these cases, for the HARQ retransmission, the CSI is partially known at the transmitter when channel conditions change slowly, or may be totally unknown when the channel conditions change quickly. In other words, the HARQ transmitter might have some aged CSI which is used in the first HARQ transmission, or in any previous transmission, and the transmitter needs to determine whether this CSI is suitable for a current HARQ retransmission. Therefore, there is a need for techniques that can employ partial or no CSI knowledge of the channel to enhance the performance of a wireless communications system.

DETAILED DESCRIPTION

Overview

Techniques are provided herein for selecting from a plurality of wireless communication techniques when a first device needs to retransmit a signal (one or more packets of data) to a second device. The first device determines when the signal which was originally wirelessly transmitted using beamforming techniques via multiple antennas of the first device to the second device needs to be retransmitted to the second device. If a retransmission is needed, the first device determines channel conditions with respect to the second device. The first device selects a retransmission scheme from a plurality of transmission schemes based on the channel conditions for retransmitting the signal via the multiple antennas of the first device to the second device.

Figure 1:
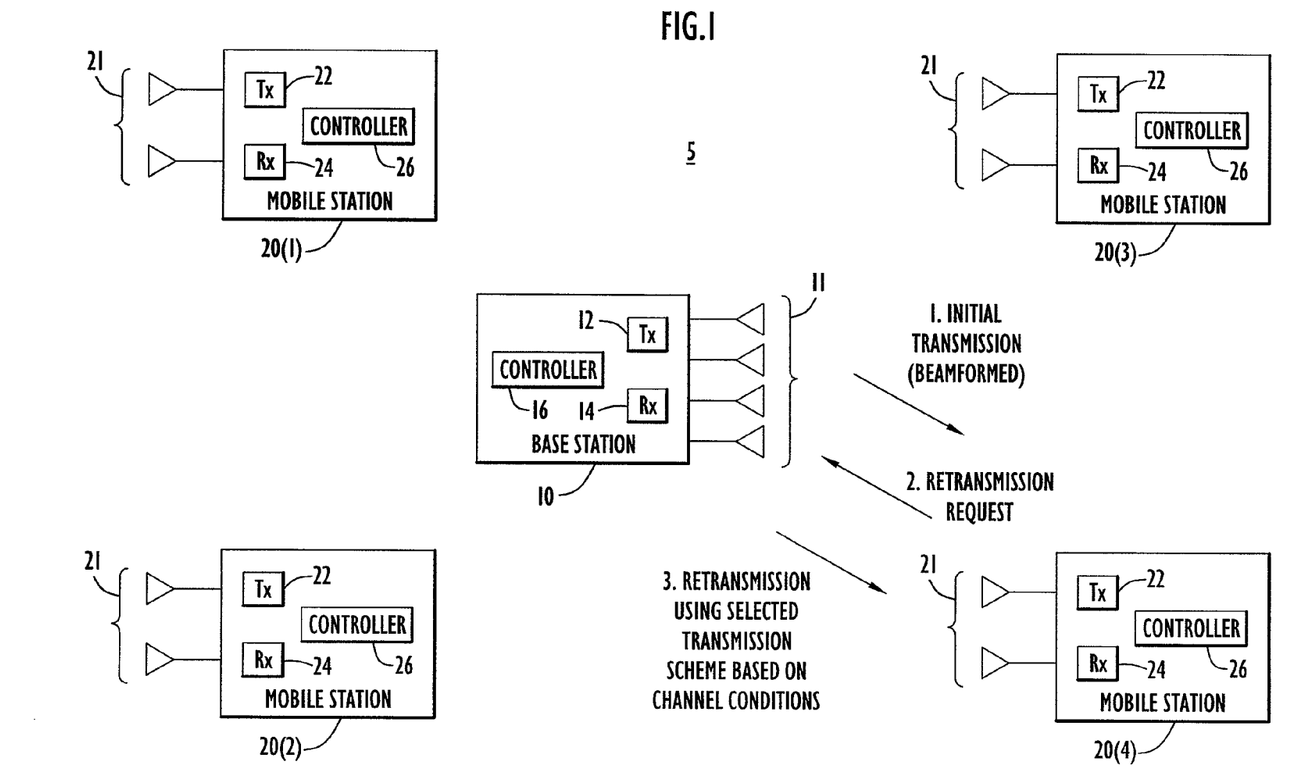
FIG. 1 is an example of a block diagram of a wireless communication system where wireless devices employ multiple-input multiple-output (MIMO) communication techniques for an initial transmission and for retransmitting if necessary.

Referring first to FIG. 1, an example of a wireless network or system 5 is shown comprising a base station (BS) 10 and multiple mobile stations (MSs) 20(1)-20(4). FIG. 1 shows that there is one BS and four MSs, but it should be understood that there may be additional BSs and more or less MSs and that FIG. 1 is merely an example.

The BS 10 comprises a plurality of antennas shown at 11, which in this example, is four antennas, though the number may be more or less. Also, the BS 10 comprises a transmitter (Tx) 12, a receiver (Rx) 14 and a controller 16. The transmitter 12 supplies transmit signals for transmission by the antennas 11 and the receiver processes received signals detected by the antennas 11. The controller 16 supplies the data to the transmitter 12 to be transmitted and processes signal received by the receiver 14. In addition, the controller 16 performs other transmit and receive control functionality. Part of the functions of the transmitter 12 and receiver 14 may be implemented in a modem and other parts of the transmitter 12 and receiver 14 may be implemented in radio transmitter and radio transceiver circuits. It should be understood that there are analog-to-digital converters (ADCs) and digital-to-analog converters (DACs) in the various signal paths to convert between analog and digital signals.

Similarly, each MS 20 comprises a plurality of antennas 21, which in this example is two antennas, though the number may be more or less. Each MS 20 comprises a transmitter 22, an receiver 24 and a controller 26, similar to that of the BS 10.

Typical wireless communications systems employ error correction techniques to protect from the presence of errors caused by noise or other impairments during transmission of signals from the transmitting device to the receiving device.

In automatic repeat request (ARQ) error correction systems, error detection codes, such as cyclic redundancy codes, are added to the transmitted data. This occurs when the BS 10 transmits data to a MS and also when a MS transmits data to the BS 10.

For example, the BS 10 sends an initial transmission comprising data and an error detection code to a particular MS, e.g., MS 20(4). The MS 26 receives the transmitted data and checks for errors and if too many errors are found the MS 26 subsequently requests retransmission of erroneous data. In many cases, the request is implicit; the receiver (in this case MS 20(4)) sends an acknowledgement (ACK) to the transmitter for correctly received data, or the transmitter (BS 10) re-sends anything that was not acknowledged by an ACK sent by the receiving device within a reasonable period of time, which is referred to as a no-ACK (referred to herein as an implicit NAK). Or, in some communication protocols, such as WiMAX, a device may transmit an NAK packet explicitly to indicate a failure to receive a transmitted packet. This latter packet is referred to herein as an explicit NAK. FEC is an error correction technique, which protects the source data by adding redundant bits. The transmitting device encodes the data with an error-correcting code and sends the coded message. The codes can be designed to make it substantially difficult to trick the receiver into misinterpreting the data. This allows the receiving device to detect and correct errors (within some bound) without the need to ask the sender for additional data.

Figure 2:
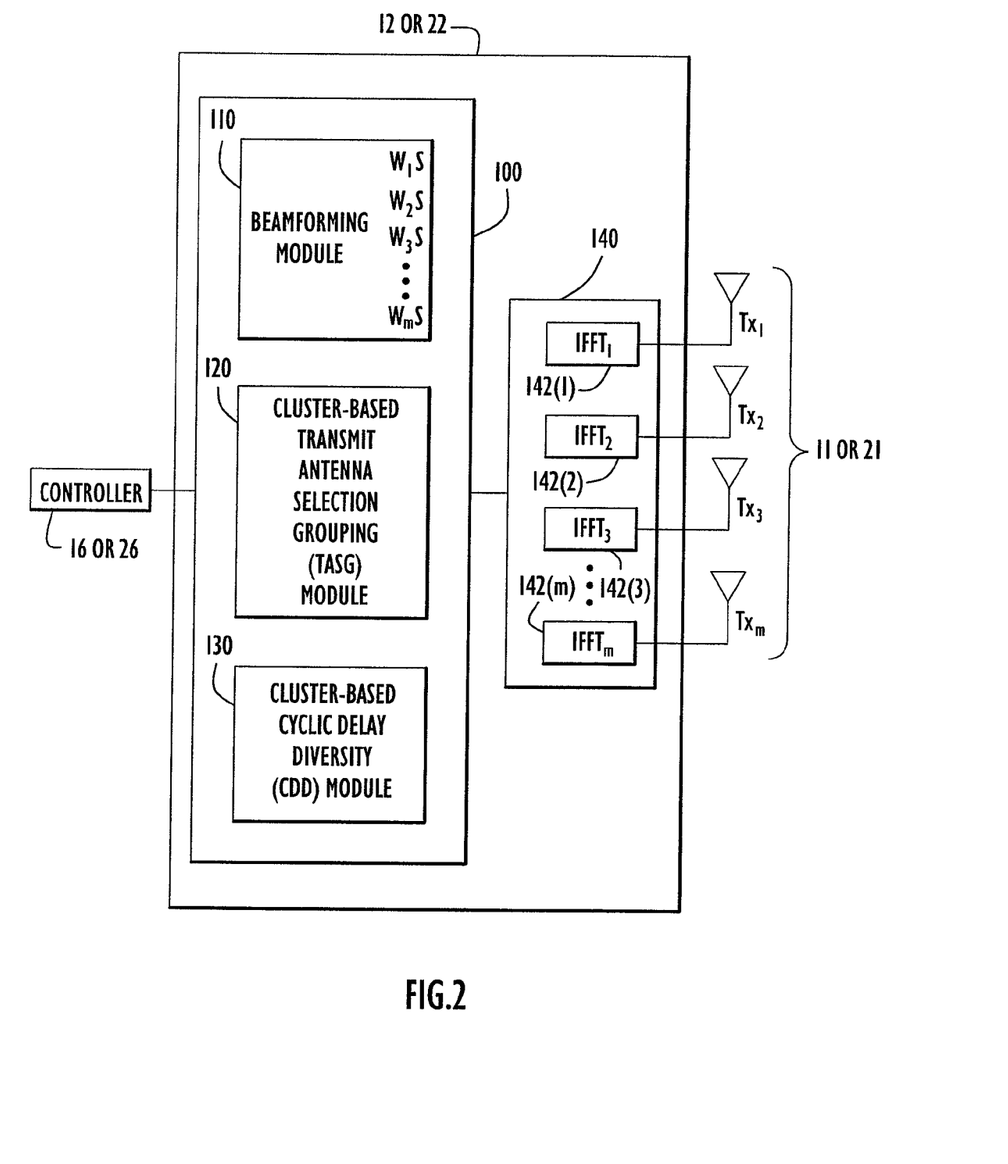
FIG. 2 is an example of a block diagram of a transmitter in a wireless device that is configured to select one of a plurality of MIMO transmission schemes for a retransmission.

FIG. 2 shows an example of a block diagram illustrating components in a BS 10 or MS 20(1)-20(4) that are relevant to the techniques described herein. There is a diversity transmit module 100 that comprises multiple transmit processing modules each capable of performing a different MIMO transmission scheme. The diversity transmit module 100 may reside within the transmitter 12 of the BS 10 and within the transmitter 22 of a MS. The diversity transmit module 100 is controlled by logic that may reside in the controller 16 in the case of the BS 10 or in the controller 26 in the case of a MS. The function of the controller shown in FIG. 2 is to select one of a plurality of transmit processing modules is used for a transmission. Thus, while FIG. 2 shows that this function may be performed by a controller that is separate from the transmitter 12 or 22, it should be understood that it may also be performed by a controller function that is local (or dedicated) to the transmitter 12 or 22.

The first transmit processing module is a beamforming module 110. The beamforming module applies beamforming weights $w_1$-$w_m$, to a signal for transmission via respective ones of the transmit antennas $Tx_1$-$Tx_m$. The second transmit processing module is a cluster-based transmit antenna selection grouping (TASG) module 120 that applies a cluster-specific weights to subcarriers of an Orthogonal Frequency Divisional Multiple Access (OFDMA) signal for transmission via the transmit antennas $Tx_1$-$Tx_m$. The function of the cluster-based TASG module is described in more detail hereinafter in conjunction with FIG. 5. The third transmit processing module is a cluster-based cyclic delay diversity (CDD) module 130 that applies cluster-specific and antenna specific delay diversity to subcarriers of an OFMDA signal for transmission via the transmit antennas $Tx_1$-$Tx_m$. The function cluster-based CDD module 130 is described in more detail hereinafter in conjunction with FIG. 6.

The diversity transmit module 100 outputs antenna specific signals that are supplied to a bank 140 of Inverse Fast Fourier Transform (IFFT) modules. There is an IFFT module associated with each transmit antenna. In the example shown in FIG. 2, the bank 140 comprises an $IFFT_1$ 142(1), $IFFT_2$ 142(2), IFFT₃ 142(3) and IFFT_m 142(m). The outputs of IFFTs 142(1)-142(m) are coupled to transmit antennas Tx₁-Tx_m. It should be understood by one with ordinary skill in the art that there are other components that would necessarily be employed in the transmit paths shown in FIG. 2, but for simplicity those components are not shown because they are not material to understanding the concepts described herein. As indicated above, the controller 16 or 26 selects which of the modules 110, 120 or 130 is used for a transmission, and in particular, for a retransmission of a signal to another device.

One or more of the blocks shown in FIG. 2 may be implemented by logic encoded in one or more tangible media (e.g., embedded logic such as an application specific integrated circuit, digital signal processor instructions, software that is executed by a processor, etc.).

Figure 3:
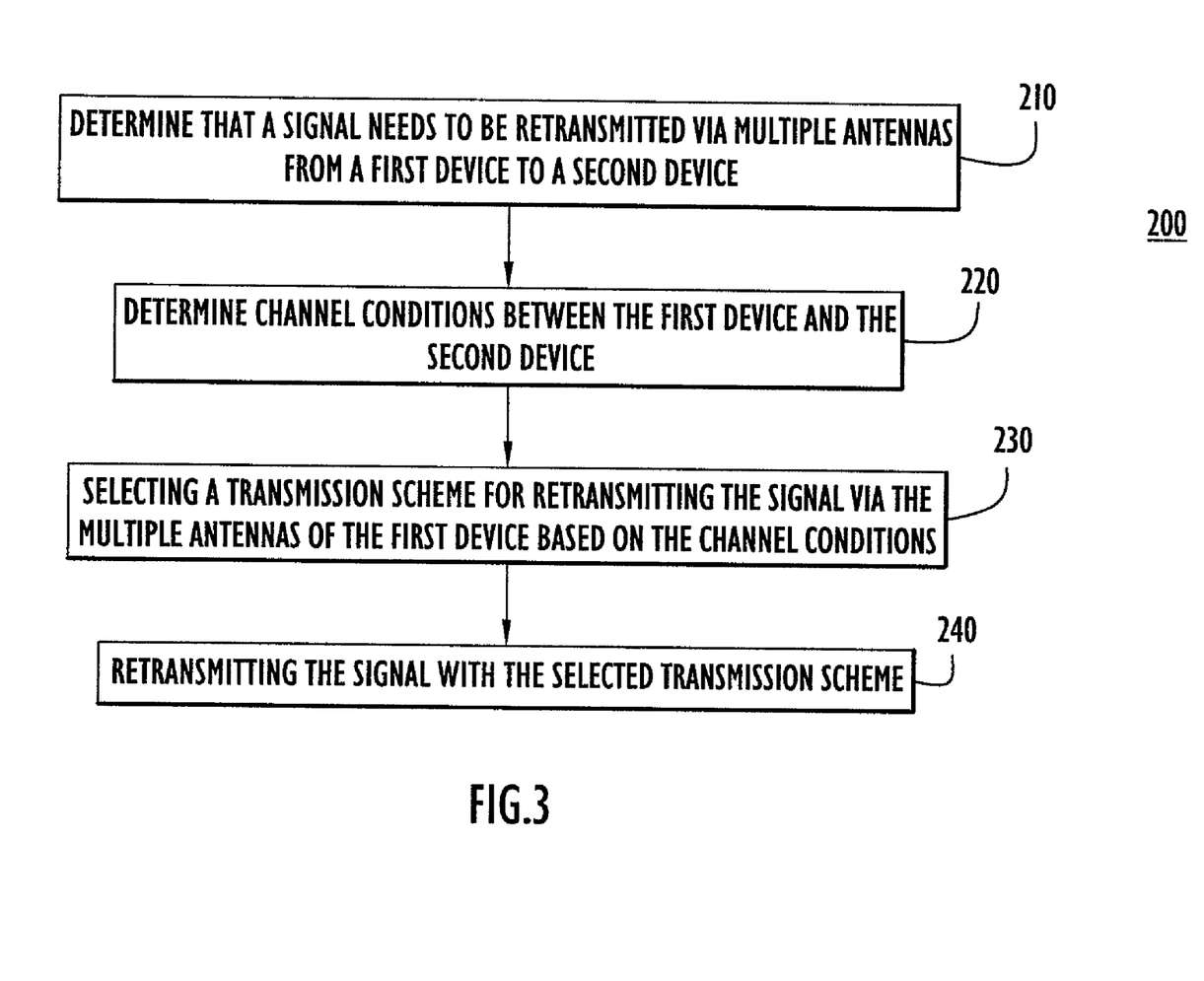
FIG. 3 is a flow chart depicting a method for selecting a transmission scheme for retransmitting a signal from a first device to a second device based on channel conditions.

FIG. 3 illustrates an example of a flow chart that generally depicts an adaptive transmission selection method. It is to be understood that this method may be practice between any two wireless devices, at least one of which has multiple antennas and the capability of performing the transmission schemes described herein. Thus, the BS 10 shown in FIG. 1 may perform this method when transmitting signals to any MS. Likewise, a MS with multiple antennas may also perform this method when transmitting signals to the BS 10 or even to another MS. Therefore, for purposes of generality, the terms "first device" and "second device" are used herein.

At 210, a first device that has transmitted a signal (e.g., data packet or packets) using beamforming techniques (via multiple antennas) to a second device determines that it needs to retransmit the signal to the second device. The need for retransmitting the signal from the first device to the second device may be based on a retransmission request that the second device transmits to the first device in the event the second device could not sufficiently correct errors in the received data. The need for retransmitting the signal may also be due to the first device not receiving an acknowledgment from the second device that the second device received the signal (an implicit NAK) or an explicit NAK referred to above. This latter situation corresponds to a NAK, referred to above.

At 220, the first device determines channel conditions between the first device and the second device. Examples of this determination are described hereinafter. Then at 230, the first device selects a transmission scheme (among a plurality of available transmission schemes) based on the channel conditions for retransmitting the signal via its multiple antennas to the second device. At 240, the first device retransmits the signal to the second device using the selected transmission scheme.

Figure 4:
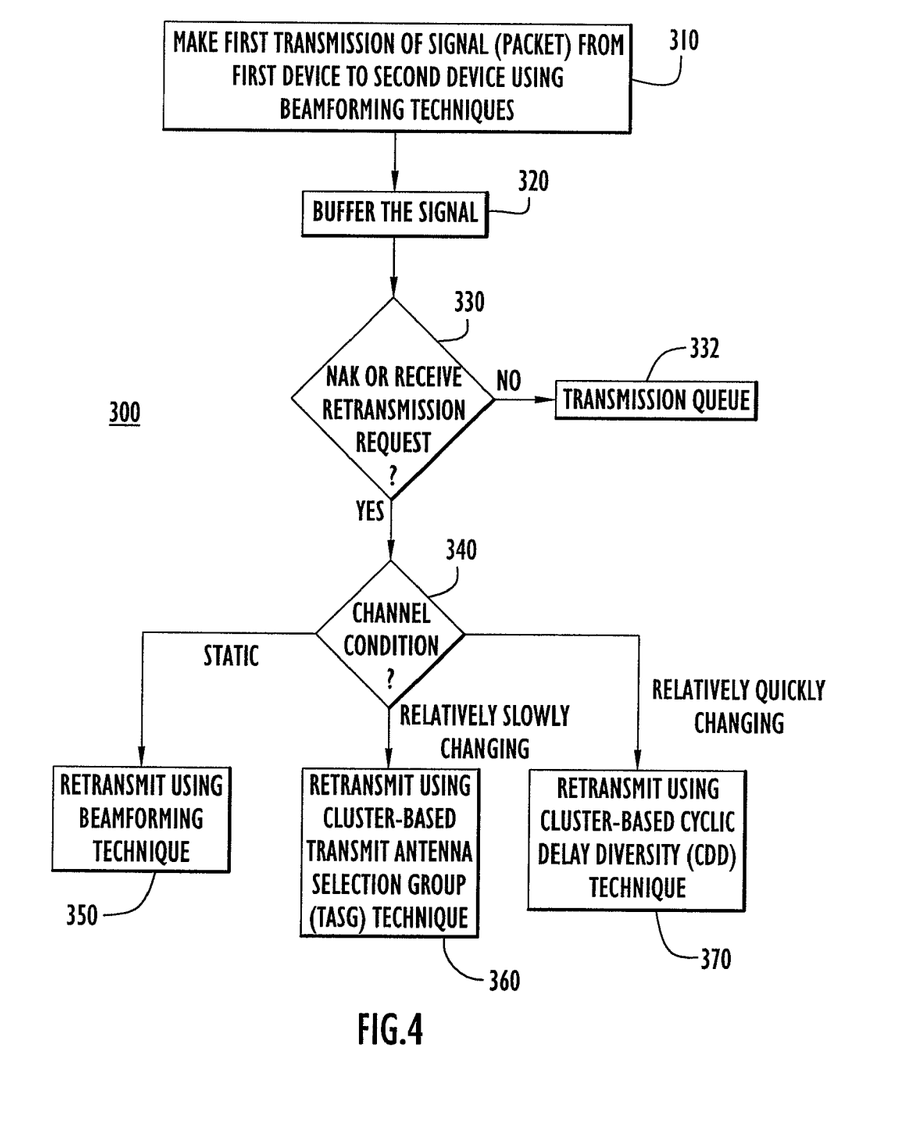
FIG. 4 is a flow chart depicting a more detailed method for selecting a transmission scheme for retransmitting a signal from a first device to a second device based on channel conditions.

FIG. 4 illustrates a flow chart that illustrates a MIMO wireless transmission method 300 that a first device may follow to increase the likelihood that the retransmission of the signal reaches the second device. Reference is also made to FIG. 2 in conjunction with FIG. 4. At 310, the first device makes a first (initial) transmission of the signal (one or more data packets) to the second device using beamforming techniques. That is, for the first or initial transmission, the beamforming module 110 in the transmitter of the first device applies beamforming weights $w_1$-$w_m$ to the signal s to be transmitted to the second device. In one example, the beamforming weights are determined from prior signals that the first device has received from the second device. However, other techniques may be employed to determine the beamforming weights that the first device uses to transmit to the second device. After the first transmission, the signal data is buffered at 320 or otherwise maintained in memory so that it can be retransmitted if needed.

At 330, it is determined whether a retransmission request has been received from the second device or whether the first device has not received an ACK from the second device in response to the first transmission without a predetermined period of time, e.g., an implicit NAK or an explicit NAK. If either case is true, then the process continues to 340. On the other hand, if an ACK is received from the second device, then at 332 the first device waits for the next transmission in the queue.

At 340, the first device determines the channel condition between the first and second device in order to select one of several transmission schemes to retransmit the signal to the second device. It is assumed that for the HARQ retransmission the updated CSI is not available. Therefore, it is necessary to choose the retransmission technique according to the channel conditions. For example, if it is determined that the channel is relatively static and constant, then at 350 the signal is retransmitted using the same beamforming technique as the previous transmission. The beamforming weights used for the first transmission may be used again for the retransmission, or the beamforming weights may be changed or updated based on other knowledge learned about the channel. If it is determined that the channel is changing relatively slowly, then at 360 the cluster-based TASG technique is used for the retransmission. Notice that antenna selection needs partial knowledge of the channel. If it is determined that the channel is changing relatively quickly, then at 370 the cluster-based CDD technique is used for the retransmission.

The Hybrid ARQ (HARQ) error correction technique is a variation of the ARQ error control technique. In standard ARQ Error Detection (ED) information bits are added to the data to be transmitted. In HARQ FEC information bits are added to the information data and the existing ED bits (such as Reed-Solomon code or Turbo code). As a result HARQ performs better than ordinary ARQ in environments with poor signal conditions. In HARQ error correction techniques, ED or FEC error-correction code information, or both, is added to each message prior to transmission. The receiver decodes the error-correction code when the coded data block is received at the receiver. If the channel quality is adequate, all transmission errors may be correctable and, the receiver can obtain the correct transmitted data block. If the channel quality is poor, not all transmission errors can be corrected. The receiver detects this situation using the ED code. Then, a retransmission is requested by the receiver, and the incorrectly received packet is stored at the receiver.

Some types of HARQ error correction technique retransmits an original packet when the first transmission fails. In one implementation of the HARQ technique, the exact same packet may be retransmitted when necessary. The receiver combines the retransmitted message with the previously received message and decodes it. Accordingly, the packet error rate can be reduced and the throughput of the wireless communication system can be increased. For HARQ retransmissions, however, the transmitting device may not have updated channel state information (CSI) and thus may have only partial CSI, that is, partial knowledge about the current channel conditions.

As explained above, it is assumed that in the first transmission, a beamforming technique is utilized, and in the retransmission, no updated CSI is available. It will be understood that the CSI from the first transmission and/or the previous transmission is known at the transmitting device. Therefore, the transmitting device has partial knowledge of the channel when the current channel conditions are correlated with the channel conditions in the first or the previous transmission; otherwise the transmitting device has no knowledge of the channel.

The controller 16 or 26 in FIG. 1 determines the instantaneous channel conditions. To this end, the controller 16 or 26 may be configured with logic to analyze data available to it to assess whether the channel conditions are static, relatively slowly changing or relatively quickly (fast) changing. The channel conditions can be measured and represented by different coefficients. For example, the temporal correlation of the channel may be employed to determine (e.g., measure) the channel conditions. The channel conditions also may be determined based on the speed of movement a device, a Doppler frequency shift due to movement of a device, and other techniques known in the art. The particular technique that is employed for the channel condition measurement depends on the implementation determined by the service provider of the underlying wireless communication system. Accordingly, in various embodiments, some thresholds may be implemented by the provider of the underlying wireless communication system to control which transmission technique is employed for the retransmission.

To be clear, there are two types of channel information involved in the techniques described herein. The instantaneous channel conditions information described above is so-called "rough" channel information because it indicates whether the channel is varying, and if so, whether it is varying slowly or quickly. This is to be contrasted with the more specific channel information needed for beamforming weights when making a beamforming transmission to a particular device. The channel information used for computing beamforming weights in general is valid only valid at a particular instant of time, and it does not reveal whether and how the channel is changing over time.

The following are non-limiting examples of ways that a device may derive channel conditions for purposes of determining which transmission technique to use for a retransmission to a particular device. One technique is to analyze signals previously received from that particular device or from other devices near the particular device. Another technique may involve a second device requesting a retransmission from a first device, and when the second device receives the retransmission, it can send channel conditions information derived from receiving the retransmission from the first device. Still another assessment of the channel conditions can be made when a first device transmits a signal to a second device and timely receives an ACK from the second device, suggesting that the channel has likely not changed much because the transmission was received and acknowledged. On the other hand, when a first device sends a transmission to a second device and does not receive an ACK or does not receive a request for retransmission from the second device, this is suggestive that the channel conditions are changing and thus the current channel information that the first device has with respect to the second device can be assumed to no longer be valid.

The channel conditions may be said to be static if there has been little change in the channel during the delay between the first or previous transmission and the retransmission. As described above, if the channel is static, the controller 16 or 26 selects the beamforming technique to process the retransmission 104. The beamforming weights $w_1$-$w_m$ used for the initial or previous transmission may be used again to retransmit the signal s to that device.

The channel conditions may be said to be relatively slowly changing if the channel is somewhat dynamic and there is some change in the channel condition during the time interval between the first or previous transmission and the retransmission such that the retransmission may still be correlated with the first or previous transmission. If the channel is relatively slowly changing, the controller 16 or 26 selects the cluster-based TASG transmission technique for the retransmission. Those skilled in the art will appreciate that the TASG transmission technique is less sensitive to inaccurate channel information than a beamforming technique.

The channel conditions may be said to be relatively quickly changing when there is substantial change in the channel during the time interval between the first or previous transmission and the retransmission. If the channel conditions are deemed to be relatively quickly changing, then the channel conditions for the retransmission are totally different from the first transmission. Consequently, the previously used beamforming weights are not useful. In this case, the controller 16 or 26 selects a diversity transmission technique for the retransmission, e.g., the cluster-based CDD transmission technique referred to above.

It will be appreciated by those skilled in the art, that one advantage of the adaptive transmission scheme switching/selecting method described herein is that the intelligence to make the selection is required only at the transmitting device. The receiving device does not need to know which of the transmission techniques that transmitting device selects.

Figure 5:
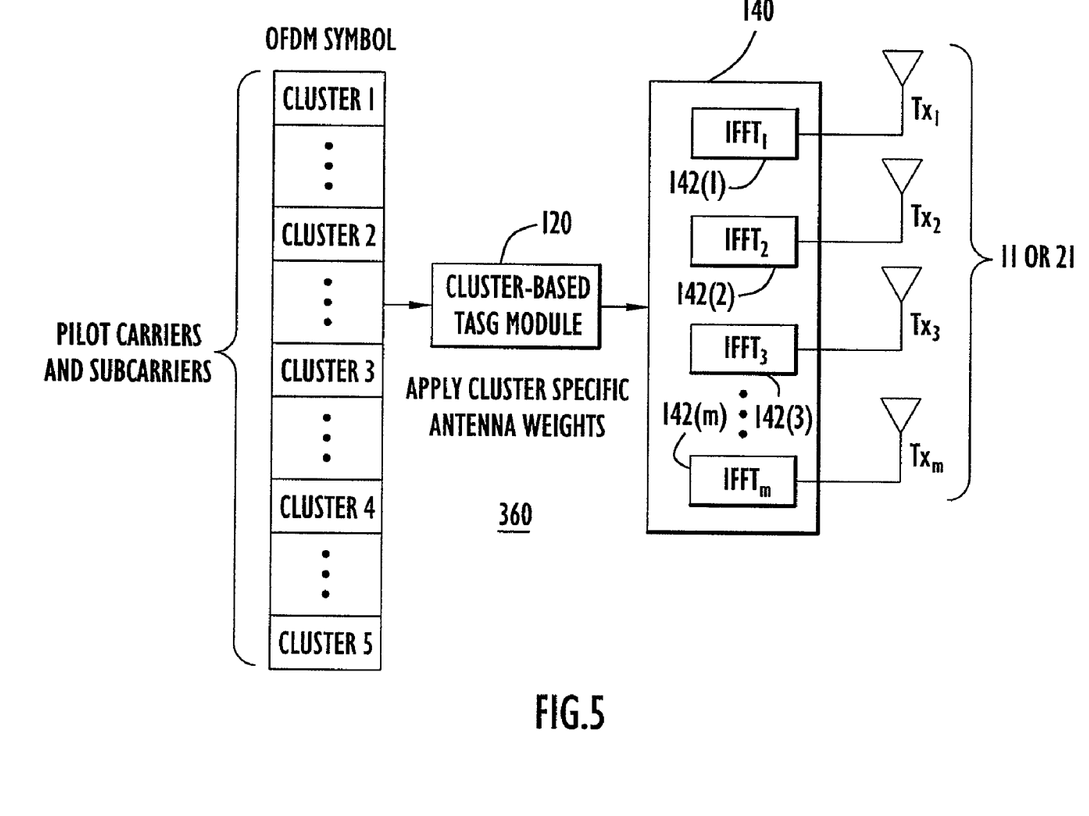
FIG. 5 is a block diagram depicting an example of a cluster-based transmit antenna selection grouping transmission scheme that may be employed for a signal retransmission.

FIG. 5 illustrates a diagram of one embodiment of a cluster-based TASG retransmission technique 360. As is known in the art, a cluster is a group of consequent tones (also called subcarriers) in an orthogonal frequency division multiple access (ODFMA) system. A set of clusters are assigned to a particular device (also called a "user"). FIG. 5 shows that one OFDM symbol comprises a plurality of subcarriers, and also shows an example where there are five clusters of subcarriers, labeled Clusters 1-5, designated throughout the symbol. Again, each device is assigned a different set of clusters. Therefore, when a first device is to make a retransmission to a second device, the first device will use the set of clusters assigned to that second device.

As described above, the cluster-based TASG transmission technique 360 may be employed when partial CSI is available at the transmitter side of a communication link during relatively slowly changing channel conditions. As shown in FIG. 5, the cluster-based TASG module 120 applies cluster specific antenna weights such that different weights are used for different antennas when a cluster is transmitted to a particular device. That is, the cluster-based TASG module 120 makes a selection of the "best" zero or more of the transmit antennas $Tx_1$-$Tx_m$ when transmitting a cluster (e.g., Cluster 1, Cluster 2, Cluster 3, Cluster 4, and/or Cluster 5) through corresponding IFFT modules 142(1)-142(m) in the IFFT bank 140. The weights may be a "hard" value, i.e., "0" or "1", or a "soft" variable value such as used for the beamforming weights. For example, in one configuration, Cluster 1 is transmitted through transmit antenna $Tx_1$ only, and Cluster 3 is transmitted through antennas $Tx_2$ and $Tx_3$ only. The selection of which antennas a cluster is to be transmitted through, or in other words the weight given to a cluster for a particular antenna is determined by the cluster-based TASG module 120 based on the partial channel condition information referred to above, i.e., that the channel is changing relatively slowly. In this manner, each antenna $Tx_1$-$Tx_m$ transmits only a portion of the OFDM symbol, which results in better Peak-to-Average Power Ratio (PAPR). It is also possible to allocate more power to some clusters since they are not transmitted using all the antennas. Since each destination device (user) in an OFDMA system is assigned a set of clusters, the cluster-based TASG module 120 stores TASG weights for all of the clusters associated with a particular destination device.

Figure 6:
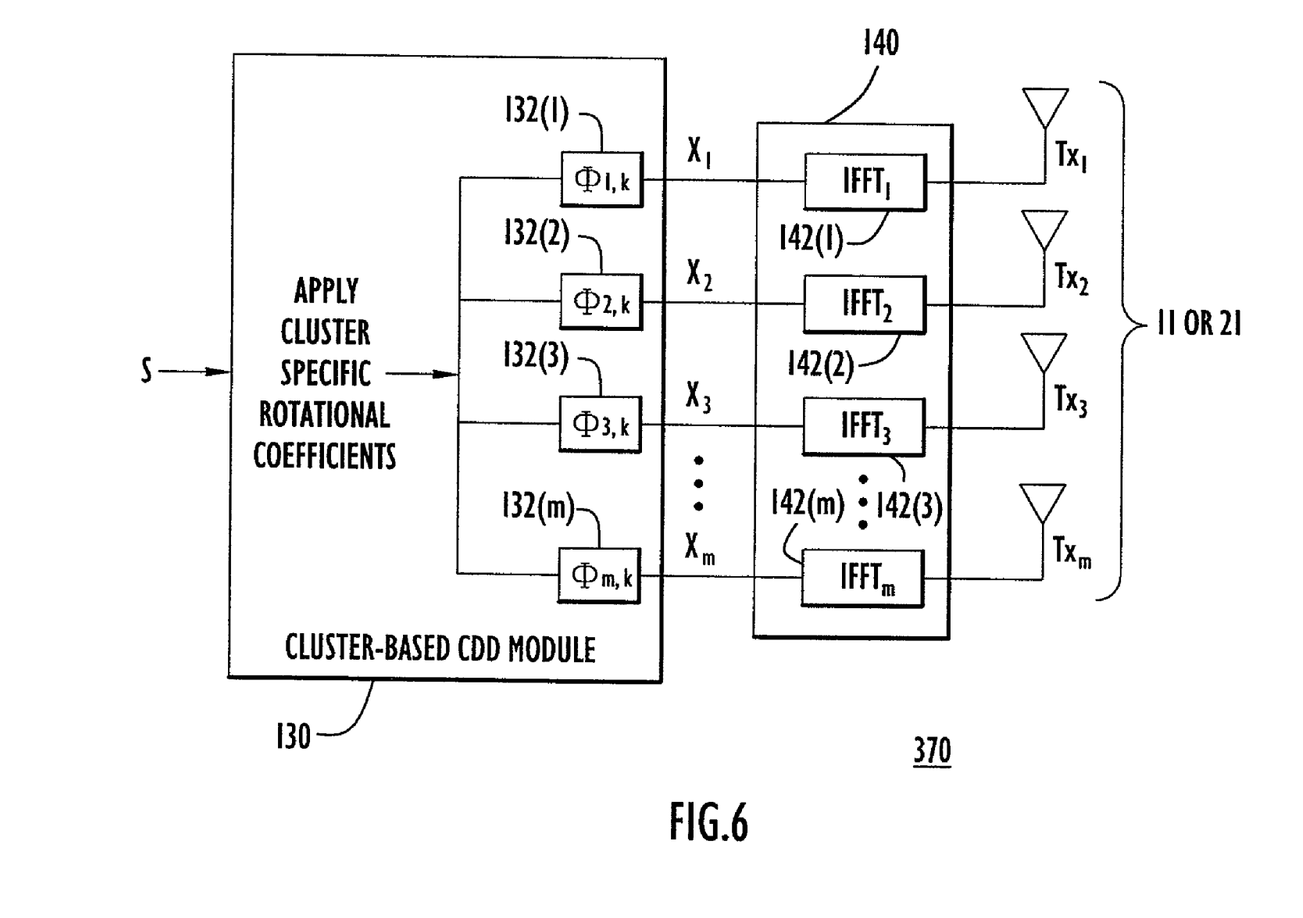
FIG. 6 is a block diagram depicting an example of a cluster-based cyclic delay diversity transmission scheme that may be employed for a signal retransmission.

FIG. 6 illustrates a diagram depicting the cluster-based CDD transmission technique 370 performed by the cluster-based CDD module 130. The cluster-based CDD module 130 receives an input signal s and generates symbols for corresponding transmit antennas. In general, symbol $x_m$ for antenna m can be expressed by:

$x_m = \Phi_{m,k} s$, where $\Phi_{m,k} = e^{j2\pi\delta_{m,k}/N}$ is the rotation coefficient for the $m^{th}$ transmit antenna ($Tx_1$, $TX_2$, $Tx_3$ ... $Tx_m$) and the $k^{th}$ tone, $\delta_{m,k}$ is a random integer, and N is the size of the Fast Fourier Transform (FFT). To this end, the cluster-based CDD module 130 comprises a plurality of rotation coefficient elements 132(1)-132(m) that produce the individual symbols $x_1$-$x_m$ for the transmit antennas from the input signal s, which are then coupled to the respective IFFT modules 142(1)-142(m) in the IFFT bank 140. The rotation coefficient elements 132(1) to 132(m) of the CDD module 130 apply cluster specific rotation coefficients to the input signal so that each cluster is assigned its own unique or specific set of delays for tones transmitted from a particular transmit antenna. This technique provides more frequency diversity than a traditional CDD retransmission technique.

Although the apparatus, system, and method for the adaptive transmission selection techniques are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method for the adaptive switching techniques, as set forth in the following claims.

What is claimed is:

1. A method comprising:
   at a transmitting device, transmitting a transmit signal to a receiving device using a beamforming technique via multiple antennas of the transmitting device, the signal comprising data and an error detection code;
   determining whether the transmit signal needs to be retransmitted to the receiving device;
   determining whether channel conditions of a channel between the transmitting device and the receiving device indicate that the channel is at least one of a static, relatively slowly changing and relatively quickly changing channel;
   selecting a first retransmission scheme from a plurality of transmission schemes when the channel between the transmitting device and the receiving device is determined to be static such that beamforming weights of the beamforming technique are used for transmitting the transmit signal for the first retransmission scheme;
   selecting a second retransmission scheme from the plurality of retransmission schemes when the channel between the transmitting device and the receiving device is determined to be relatively slowly changing such that a cluster-based antenna selection technique is used for the second retransmission scheme; and
   selecting a third retransmission scheme from the plurality of retransmission schemes when the channel between the transmitting device and the received device is determined to be relatively quickly changing such that a cluster-based cyclic delay technique is used for the third retransmission scheme.

2. The method of claim 1, wherein determining whether the transmit signal needs to be retransmitted comprises receiving at the transmitting device from the receiving device a request for retransmitting the transmit signal.

3. The method of claim 1, wherein determining whether the transmit signal needs to be retransmitted comprises determining that the transmit signal is to be retransmitted in response to the transmitting device not receiving a reception acknowledgment from the receiving device indicating that the receiving device received the transmit signal.

4. The method of claim 1, and further comprising retransmitting the transmit signal from the transmitting device to the receiving device using the beamforming weights of the beamforming technique.

5. The method of claim 1, wherein determining whether channel conditions between the transmitting device and the receiving device indicate that the channel is static further comprises determining that the channel conditions are relatively quickly changing and wherein selecting the second retransmission scheme comprises selecting a cyclic delay diversity transmission scheme for an orthogonal frequency division multiple access (OFDMA) signal in which subcarriers are grouped into clusters, and a set of clusters is assigned to a particular device, and wherein the cyclic delay diversity transmission scheme applies cluster specific rotation coefficients to the clusters assigned to the receiving device that result in corresponding delays for subcarriers transmitted by corresponding ones of the multiple antennas of the transmitting device to the receiving device.

6. The method of claim 5, and further comprising determining the cluster specific rotation coefficients based on the channel conditions.

7. The method of claim 1, wherein selecting the first retransmission scheme comprises selecting a cluster-based transmit antenna selection group transmission scheme for an orthogonal frequency division multiple access (OFDMA) signal in which subcarriers are grouped into clusters, and a set of clusters is assigned to a particular device, and wherein the cluster-based transmit antenna selection group transmission scheme applies weights to the set of clusters associated with the receiving device that result in each cluster being transmitted by zero or more of the multiple antennas of the transmitting device to the receiving device.

8. The method of claim 7, and further comprising determining the weights applied to the clusters in the cluster-based transmit antenna selection group transmission scheme based on the channel conditions, and wherein the weights are zero or one, or a value between zero and 1.

9. The method of claim 7, wherein the cluster-based transmit antenna selection group transmission scheme results in each of the multiple antennas of the transmitting device transmitted only part of a symbol, and further comprising allocating more power to certain clusters.

10. The method of claim 1, further comprising receiving a response signal from the receiving device, wherein determining whether the transmit signal needs to be retransmitted comprises determining, from the response signal received from the receiving device, whether the transmit signal needs to be retransmitted.

11. The method of claim 10, wherein determining whether the transmit signal needs to be retransmitted comprises determining, from a request for retransmission in the response signal generated by evaluating the error detection code in the transmit signal, whether the transmit signal needs to be retransmitted.

12. An apparatus, comprising:
a plurality of antennas;
a transmitter coupled to the plurality of antennas and configured to transmit a transmit signal to a receiving device, the signal comprising data and an error detection code transmitted via the plurality of antennas using any one of a plurality of a multiple-input-multiple-output (MIMO) wireless transmission techniques, at least one of which is a beamforming technique; and
a controller coupled to the transmitter that is configured to:
determine whether the transmit signal needs to be retransmitted to the receiving device;
determine whether channel conditions of a channel with the transmitting device indicate that the channel is at least one of a static, relatively slowly changing and relatively quickly changing channel;
select a first retransmission scheme from the plurality of transmission schemes when the channel is determined to be static such that beamforming weights of the beamforming technique are used for transmitting the transmit signal for the first retransmission scheme;
select a second retransmission scheme from the plurality of retransmission schemes when the channel is determined to be relatively slowly changing such that a cluster based antenna selection technique is used for the second retransmission scheme; and
select a third retransmission scheme from the plurality of retransmission schemes when the channel is determined to be relatively quickly changing such that a cluster-based cyclic delay technique is used for the third retransmission scheme.

13. The apparatus of claim 12, wherein the controller determines when the transmit signal needs to be retransmitted by receiving a request from the receiving device for retransmitting the transmit signal.

14. The apparatus of claim 12, wherein the controller determines that the transmit signal is to be retransmitted in response to not receiving a reception acknowledgment from the receiving device indicating that the receiving device received the transmit signal.

15. The apparatus of claim 12, wherein when the controller determines that the channel conditions are relatively quickly changing, the controller selects a cyclic delay diversity transmission technique for an orthogonal frequency division multiple access (OFDMA) signal in which subcarriers are grouped into clusters, and a set of clusters is assigned to a particular device, and wherein the cyclic delay diversity transmission scheme applies cluster specific rotation coefficients to the clusters assigned to the receiving device that result in corresponding delays for subcarriers transmitted by corresponding ones of the plurality of antennas to the receiving device.

16. The apparatus of claim 15, wherein the controller determines the cluster specific rotation coefficients based on the channel conditions.

17. The apparatus of claim 12, wherein when the controller determines that the channel conditions are relatively slowly changing, the controller selects a cluster-based transmit antenna selection group transmission technique for an orthogonal frequency division multiple access (OFDMA) signal in which subcarriers are grouped into clusters, and a set of clusters is assigned to a particular device, and wherein the cluster-based transmit antenna selection group transmission scheme applies weights to the set of clusters associated with the receiving device that result in each cluster being transmitted by zero or more of the plurality of antennas to the receiving device.

18. The apparatus of claim 17, wherein the controller determines the weights applied to the clusters in the cluster-based transmit antenna selection group transmission technique based on the channel conditions, and wherein the weights are zero or one, or a value between zero and one.

19. The apparatus of claim 17, wherein the controller allocates more power to certain of the clusters.

20. A computer program logic stored in one or more non-transitory tangible media for execution and when executed operable to:
determine whether the transmit signal which was originally wirelessly transmitted using a beamforming technique via multiple antennas of a transmitting device to a receiving device needs to be retransmitted to the receiving device;
determine whether channel conditions of a channel between the transmitting device and the receiving device indicate that the channel is at least one of a static, relatively slowly changing and relatively quickly changing channel;
select a first retransmission scheme from a plurality of transmission schemes when the channel between the transmitting device and the receiving device is determined to be static such that beamforming weights of the beamforming technique are used for transmitting the transmit signal for the first retransmission scheme;
select a second retransmission scheme from a plurality of retransmission schemes when the channel between the transmitting device and the receiving device is determined to be relatively slowly changing such that a cluster based antenna selection technique is used for the second retransmission scheme; and
select a third retransmission scheme from the plurality of retransmission schemes when the channel is determined to be relatively quickly changing such that a cluster-based cyclic delay technique is used for the third retransmission scheme.

21. The computer program logic of claim 20, wherein the logic is operable to select the beamforming technique for retransmitting the signal from the transmitting device to the receiving device when the channel conditions are static.

22. The computer program logic of claim 20, wherein the logic is operable to select the second transmission scheme comprising a cyclic delay diversity transmission scheme for an orthogonal frequency division multiple access (OFDMA) signal in which subcarriers are grouped into clusters, and a set of clusters is assigned to a particular device, and wherein the cyclic delay diversity transmission scheme applies cluster specific rotation coefficients to the clusters assigned to the receiving device based on the channel conditions that result in corresponding delays for subcarriers transmitted by corresponding ones of the multiple antennas of the transmitting device to the receiving device.

23. The computer program logic of claim 20, wherein the logic is operable to select the first retransmission scheme comprising a cluster-based transmit antenna selection group transmission scheme for an orthogonal frequency division multiple access (OFDMA) signal in which subcarriers are grouped into clusters, and a set of clusters is assigned to a particular device, and wherein the cluster-based transmit antenna selection group transmission scheme applies weights to the set of clusters associated with the receiving device based on the channel conditions that result in each cluster being transmitted by zero or more of the multiple antennas of the first device to the receiving device.

* * * * *